Aug. 13, 1963  J. D. FANNIN  3,100,336
DENT REPAIR METHOD FOR AUTOMOBILE BODIES
Original Filed May 23, 1957  2 Sheets-Sheet 1
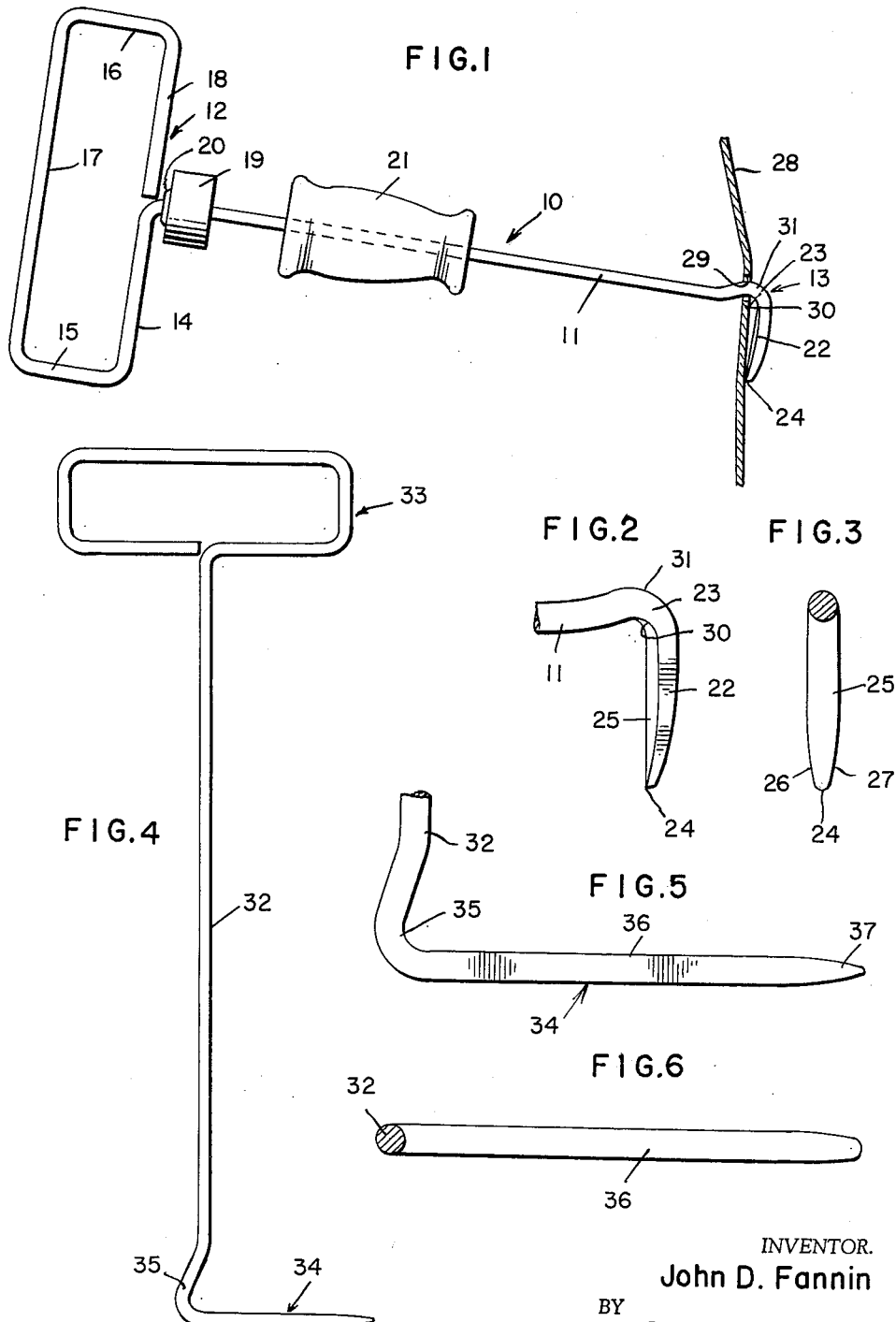
INVENTOR.
John D. Fannin Aug. 13, 1963  J. D. FANNIN  3,100,336
DENT REPAIR METHOD FOR AUTOMOBILE BODIES
Original Filed May 23, 1957  2 Sheets-Sheet 2
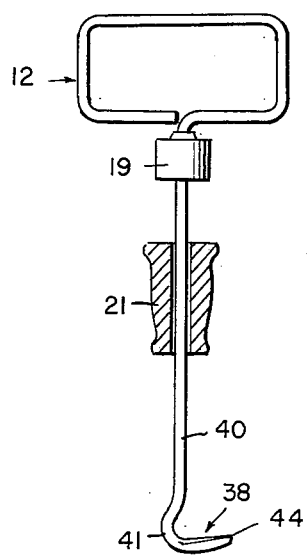
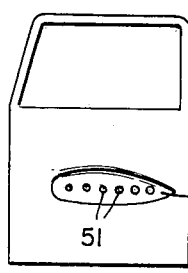
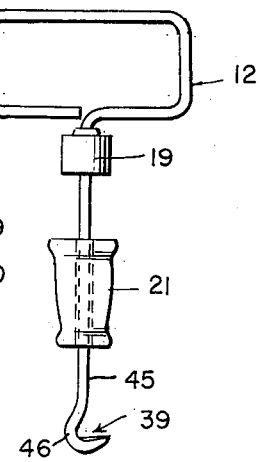
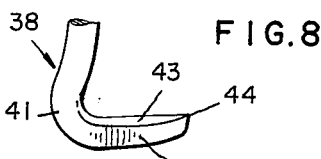
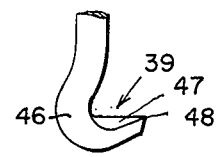
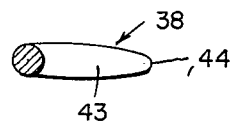
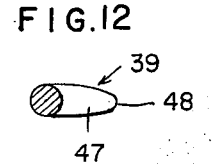
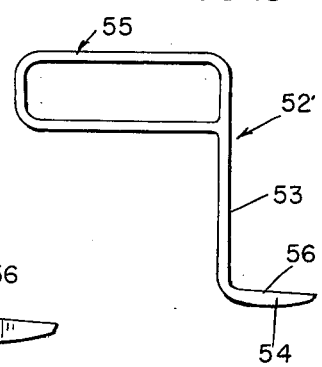
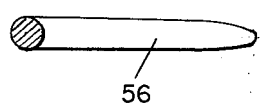
INVENTOR.
John D. Fannin
BY
ATTYS

United States Patent Office 3,100,336
Patented Aug. 13, 1963

3,100,336
DENT REPAIR METHOD FOR AUTOMOBILE BODIES
John D. Fannin, Mare Creek, Ky.
(P.O. Box 185, North Manchester, Ind.)
Continuation of application Ser. No. 661,100, May 23, 1957. This application Mar. 4, 1960, Ser. No. 12,648
3 Claims. (Cl. 29—401)

This invention relates generally to automotive body working tools and pertains more particularly to a type of tool and method of body working which represents a material departure from conventional tools and methods.

This application is a continuation of application Serial No. 661,100, filed May 23, 1957 and later abandoned.

In working metal, and more particularly in repairing automotive bodies, damage is frequently encountered at such points at which it is very difficult to deliver a force or blow sufficiently to restore the metal to its original condition. For example, in automotive door panels, with the conventional construction of door where there is an outer panel and in generally spaced parallel relation thereto an inner panel. If the outer panel become damaged, it is frequently very difficult to get inside the door structure to force the outer panel back to its original position and condition and in any event will necessitate the removal of the trim panel which is secured to the inner panel of the door proper. It would be desirable to devise tools and a method which would enable the body mechanic to remove such dents without necessitating going inside the automobile structure to do so and it is, therefore, a primary object of this invention to provide a tool and method by which dents in metallic objects, such as automobile bodies, may be removed without necessitating gaining access to the interior of the same.

It is another object of this invention to provide a novel method of body working and the like which contemplates the drilling of a series of holes in the body metal in the damaged region thereof and then working out the damaged area entirely exteriorly of the body and without necessitating the removal of any interior trim or operating parts.

Another object of this invention is to employ a hook-like body working tool incorporating a laterally directed end portion adapted to be projected through an opening drilled in a body panel so as to reach around behind the panel to transmit an outwardly directed force or blow to the body panel and thus remove the damaged area thereof.

A further object of this invention is to provide a tool of the character described in the preceding object wherein the tool incorporates an offset arcuate portion at the juncture of the laterally offset end portion and the main shank of the tool, whereby the tool may be rocked through an associated opening such that the free end of the lateral projection may be engaged against the inner surface of the damaged body panel without binding in the opening or enlarging the same.

A further object of this invention is to provide a body tool of the character described incorporating an elongate shank having a handle portion at one end of having a laterally directed head at its other end wherein the handle, shank and head lie in a common plane for most advantageously manipulating the tool.

Another object of this invention is to provide a body tool of the character set forth in the preceding object having a hammer slidable on said shank and wherein the shank has rigidly attached thereto an anvil so that the hammer may be slid long the shank to strike the anvil and transmit a working force axially, longitudinally of said shank.

Still another object of this invention is to provide a novel method for removing damaged areas from metallic bodies involving the steps of forming openings in spaced relationship and along a line of deepest damage and then working the damaged area outwardly starting at points remotest from such openings and at the marginal portion of the damaged area inwardly toward the openings and thereafter filling the openings and smoothing the damaged area throughout the same for re-finishing.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

FIG. 1 is an elevational view, partly in section, showing one form of tool and its manner of application and use in connection with a damaged portion of a body panel;

FIG. 2 is a partial perspective view showing the head end portion of the tool shown in FIG. 1;

FIG. 3 is a transverse sectional view taken adjacent to and looking toward the head end of the tool in FIG. 1;

FIG. 4 is an elevational view showing another form of tool used primarily for roughing out damaged portions of an automobile body;

FIG. 5 is an enlarged view showing the head end portion of the tool shown in FIG. 4;

FIG. 6 is a view similar to FIG. 3 but showing the head end portion of the tool of FIG. 4;

FIG. 7 is an elevational view, partly in section, showing a further form of tool construction used for gradually working out the damaged body portion;

FIG. 8 is a partial perspective of the head end portion of the tool shown in FIG. 7;

FIG. 9 is a transverse sectional view similar to FIG. 3 but showing the head end of the tool in FIG. 7;

FIG. 10 is an elevational view showing another form of the tool;

FIG. 11 is an enlarged partial perspective showing the head end of the tool in FIG. 10;

FIG. 12 is a cross sectional view similar to FIG. 3 but showing the head end of the tool in FIG. 10;

FIG. 13 is an elevational view showing another form of the tool used for finishing;

FIG. 14 is an enlarged partial elevational view showing the head end of the tool in FIG. 13;

FIG. 15 is a sectional view similar to FIG. 3 but showing the head end of the tool in FIG. 13; and FIG. 16 is an elevational view showing a door panel illustrating a damaged area thereof and showing the manner in which the openings are drilled in the damaged area in accordance with the method of this invention.

Referring at this time particularly to FIGS. 1-3, the tool shown therein is indicated generally by the reference character 10 and includes an elongate shank 11 having a handle portion 12 at one end and at its opposite end an elongate head portion 13. Preferably, the tool is formed from a single piece of elongate rod-like material with the handle portion 12 being formed by bending the stock laterally from the shank 11 at one end thereof in the portion 14 and then bending the same into generally rectangular shape so as to provide opposite end portions 15 and 16, a single outer side portion 17 and the terminal portion 18 which extends back toward the shank 11 co-extensively with the first mentioned portion 14, all of such handle portions lying in a common plane with the shank 11.

Attached to the shank 11 immediately adjacent the handle portion 12 is an anvil member 19 which may be of cylindrical configuration, having a centrally located bore receiving the shank 11 and being rigidly affixed thereto such as by welding 20 or the like. Slidable on the shank 11 is a hammer element 21 which may be freely moved axially along the shank to strike the anvil 19 and thus exert a working force to the tool.

Preferably, the hammer 21 is so shaped as to have its outer surface provide a conventional hand grip such that the tool may be gripped with one hand in the handle portion 12 thereof with the operator's other hand grasping the hammer 21 for moving it into engagement with the anvil 19.

The working head 13 is formed integrally with the shank and has a main body portion 22 which is disposed at substantially right angles to the shank and projects laterally thereof, the main body portion being joined to the shank by means of an arcuate offset portion 23. The body portion 22 is preferably provided with a relatively pointed tip 24 and with the inner side 25 thereof formed relatively flat, the opposite sides 26 and 27 adjacent the free end of this body portion being tapered inwardly to present the aforementioned tip 24.

FIG. 1 illustrates the manner in which the tool may be used and in this figure the reference character 28 represents a section of metal which has been damaged or dented and through which the working head of the tool has been projected for removing the damaged area. For this purpose, a hole 29 is drilled in the metal at or near the lowest point of the damaged area and the tool, as can be seen from this figure, is inserted through this opening with the tip 24 of the head 13 being engaged against the inner side of the metal panel adjacent the ridged area thereof which constitutes the boundary of the damaged area. With the tool thus positioned, repeated blows delivered by the hammer 21 against the anvil 19 will exert sufficient outward force to the metal panel to raise the damaged area in the marginal portions thereof. From FIG. 1, it will be evident that the manner of use of the tool shown in that figure is such that the tip end portion 24 serves to produce the actual working of the metal panel and for this reason, the tool illustrated in FIGS. 1-3 may properly be termed a picking tool.

For ease of manipulation, the head 13 of the tool lies in a plane common with the plane of the shank 11 and the handle 12, this being especially true since the tool must be tilted so as to engage only the tip portion 24 against the inner side of the metal panel which is being worked. This tilting of the tool is permitted by virtue of the existence of the arcuate connecting portion 23 joining the shank 11 and the head 13. The arcuate offset portion 23 presents a throat 30 adjacent the body portion 22 and a nose portion 31 opposite thereto which permits the offset portion to be manipulated through the hole 29 in such a manner as to clear the sides thereof and prevent interference between the offset portion and the hole when the tool is tilted such as would tend to enlarge the hole 29 or cause further damage to the metal panel in the region immediately adjacent to the hole. It has been found that this arcuate offset portion is of essential consideration for proper manipulation of the tool so as to permit the tip 24 to be placed as desired and, further as to permit substantially only this portion of the head to be engaged against the inner surface of the metal panel.

The tool shown in FIGS. 4-6 inclusive may be termed a roughing tool and comprises an elongate shank 32 and having a handle 33 at one end and a head 34 at the opposite end with the head 34 being joined to the shank 32 by the arcuate offset portion 35. In general form, the tool shown in FIGS. 4-6 is quite similar to that shown in FIGS. 1-3 and described above, the handle 33, shank 32 and head portion 34 lying in a common plane and with the offset portion 35 operating in the same manner as is described above. The head 34, however, is considerably longer than the head of the tool shown in FIG. 1 and the inner surface 36 thereof is relatively flat and terminates in a more or less pointed tip 37. The roughing tool is manipulated through the hole 29 in the metal panel and is used primarily for general roughing work, that is, to initially bring out particularly damaged areas to approximately the proper positions and a straight pulling force is exerted by the operator on the tool for this purpose. The offset portion 35 permits the operator to engage the tip 37 or any desired extent of the surface 36, against the inner surface of the panel so that localized or general force may be applied to the panel in initially lifting out the damaged areas. In other words, the tool shown in FIG. 4 would ordinarily be the first one used unless the damage was very slight and tools, such as those shown in FIG. 1, would be utilized subsequent to the tool shown in FIG. 4 and for the purpose of more accurately restoring the outer surface of the metal panel to its original condition.

The tool shown in FIGS. 7-9 and the tool shown in FIGS. 10-12 are very similar to the tool shown in FIGS. 1-3 and their purpose, as hereinafter set forth, is very similar thereto, the latter tool differing from the tool of FIG. 1 and from each other in the particular shape and construction of the head portions 38 and 39 respectively thereof. In the case of the tool shown in FIGS. 7-10, the head 38 is joined to the shank 40 by means of the arcuate offset portion 41 and the main body portion 42 of the head is provided with a flat inner surface 43 and a pointed tip 44, used for picking purposes.

The tool of FIGS. 10-12 has its head 39 joined to the shank 45 by means of the arcuate offset portion 46 and is provided with a flat inner surface 47 terminating in a pointed tip 48.

The tools of FIGS. 1, 7 and 10 respectively differ essentially only in the length of the head portions thereof, the tool of FIG. 1 having the longest head portion such that its tip 24 may be engaged against the inner surface of the metal panel, a substantial distance from the hole 29 and the tools of FIGS. 7 and 10 respectively have progressively shorter heads for engaging localized areas of the metal panel closer to the opening 29.

FIG. 16 illustrates a door panel 49 having a damaged area 50. In practicing this invention, a series of holes 51 are drilled in the damaged area 50 along the line of the lowest depression therein. The holes are spaced from each other by an amount approximately equal to or slightly less than twice the length of the head of the longest picking tool shown in FIG. 1 and it is to be appreciated that the number of holes 51 and the exact location thereof may be so chosen that the entire area which has been damaged can be reached by the longest picking tool. That is to say, should the damaged area be of sufficient dimensions that the marginal portion thereof cannot be reached with the longest picking tool through a single line of holes extending along the lowest depressed portion thereof, enough additional holes must be provided so that the entire area which has been damaged can be reached by the longest picking tool. After the holes have been drilled, the roughing tool shown in FIG. 4 may be utilized, if necessary, and subsequent to the use of this tool, if it is necessary to use the same, the tool shown in FIG. 1 is used and starting with the holes closest to the marginal edge of the damaged area, the picking tool of FIG. 1 is used to restore the damaged area to its original outside contour and shape, the work progressing from the shallowest portions of the damaged area progressively to the deepest damaged area. The tool of FIG. 1 is used first and then shorter picking tools are used to work the metal closer to the various holes 51 until the entire damaged area has been worked over by the various picking tools in such a way as to restore the approximate original contour of the area. The usual body working method may then be employed to either file or sand the surface thus restored to determine the high and low spots and further picking may be indicated at this point, in which case such work is done.

To finish the restoration of the surface, a dolly such as that indicated in FIGS. 13-15 is used. The dolly 52 is provided with a relatively short shank portion 53 having a laterally projecting head 54 at one end and at its opposite end a handle 55 projecting laterally in the opposite direction from the head 54 and with the head, handle and shank lying in a common plane substantially as is shown in FIG. 13. The head 54 is provided with a flat upper surface 56 which is intended to be engaged along its complete length with the inner surface of the metal panel so that a body hammer may be used in conjunction therewith to provide the finished worked surface of the metal panel by striking the hammer against the outer surface of the metal panel with the flat dolly surface 56 backing up the blows on the inner surface of the panel. It will be noted that the dolly surface 56 extends substantially completely to the shank 53 and presents a relatively sharp corner in the region 57 thereof so that the metal panel may be worked right up to the edges of the holes provided therein for the tool to project through the metal panel. All that remains to be done after use of the dolly is to finish sand the restored surface and repaint it after the various holes have been filled by any suitable means, such as conventional solder or the like and sanded smooth.

I claim:

1. The method of repairing damaged areas in automobile body panels which comprises forming a series of openings in the panel within the confines of the damaged area thereof, utilizing said openings to permit access to the inner surface of the panel within the confines of the damaged area thereof and progressively inwardly lifting out the damaged areas of the panel inwardly from the marginal edges thereof.

2. The method of repairing damaged areas in a metallic panel which comprises forming a series of openings through the panel along the deepest portion of the damaged area, inserting a tool through the opening with a portion extending laterally to engage the inner surface of the panel and an outwardly projecting handle portion, applying force to the outwardly projecting handle portion to apply outwardly directed force to localized areas of the inner surface of the panel remote from the associated opening, and progressively applying force to localized areas closer to the associated opening thereby progressively raising the damaged areas of the panel substantially flush with the surrounding undamaged areas.

3. The method of repairing damaged areas in automobile body panels which comprises forming a series of holes within the damaged area and successively applying outwardly directed blows to differently located points around each hole by successively inserting a tool through the holes to reach behind and against the inner surface of the body panel to such points spaced from the hole through which the tool is inserted.

References Cited in the file of this patent

UNITED STATES PATENTS

| | | |
|---|---|---|
| 2,471,557 | Bishop | May 31, 1949 |
| 2,485,486 | Ferguson | Oct. 18, 1949 |
| 2,605,658 | Sanchez | Aug. 5, 1952 |
| 2,749,795 | Boykin | June 12, 1956 |
| 2,768,544 | Back | Oct. 30, 1956 |
| 2,791,926 | Guyton | May 14, 1957 |
| 2,799,190 | Awot | July 16, 1957 |
| 2,844,060 | Hagerty et al. | July 22, 1958 |
| 2,860,408 | Woyton | Nov. 18, 1958 |
| 2,900,853 | Steck | Aug. 25, 1959 |
| 2,934,984 | Woodman | May 3, 1960 |
| 2,941,429 | Mason | June 21, 1960 |